T. HALLIWELL.
APPARATUS FOR CONDITIONING OR DAMPING YARNS OR THREADS.
APPLICATION FILED MAR. 22, 1915.

1,249,384.

Patented Dec. 11, 1917
2 SHEETS—SHEET 1.

UNITED STATES PATENT OFFICE.

THOMAS HALLIWELL, OF ECCLES, NEAR MANCHESTER, ENGLAND.

APPARATUS FOR CONDITIONING OR DAMPING YARNS OR THREADS.

1,249,384.  Specification of Letters Patent.  Patented Dec. 11, 1917.

Application filed March 22, 1915. Serial No. 16,228.

*To all whom it may concern:*

Be it known that I, THOMAS HALLIWELL, a subject of the King of Great Britain and Ireland, and resident of Eccles, near Manchester, England, have invented certain new and useful Improvements in Apparatus for Conditioning or Damping Yarns or Threads, of which the following is a specification.

This invention has for its object an improved construction of apparatus for conditioning or damping yarns or threads.

Figure 1:
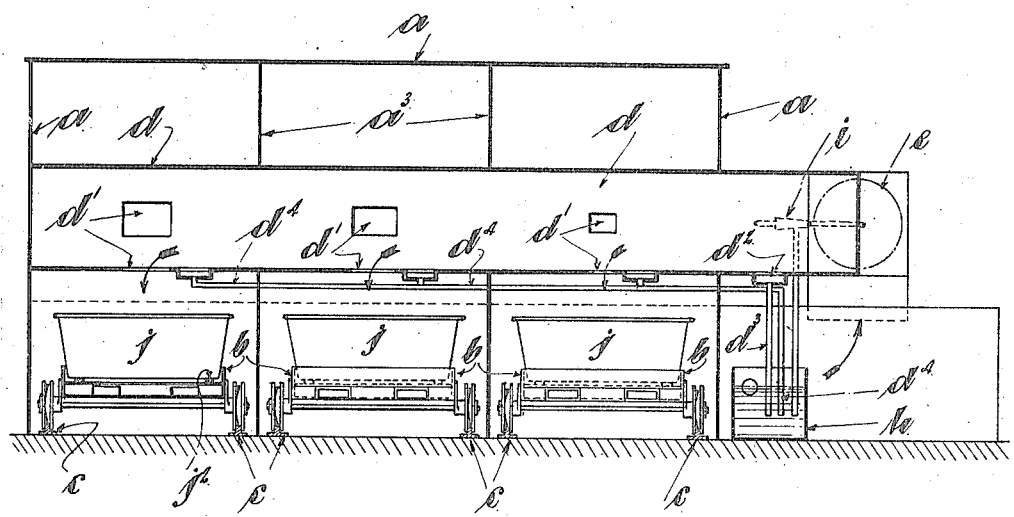

In the accompanying drawings,

Figure 1 illustrates a front sectional elevation, and

Figure 2:
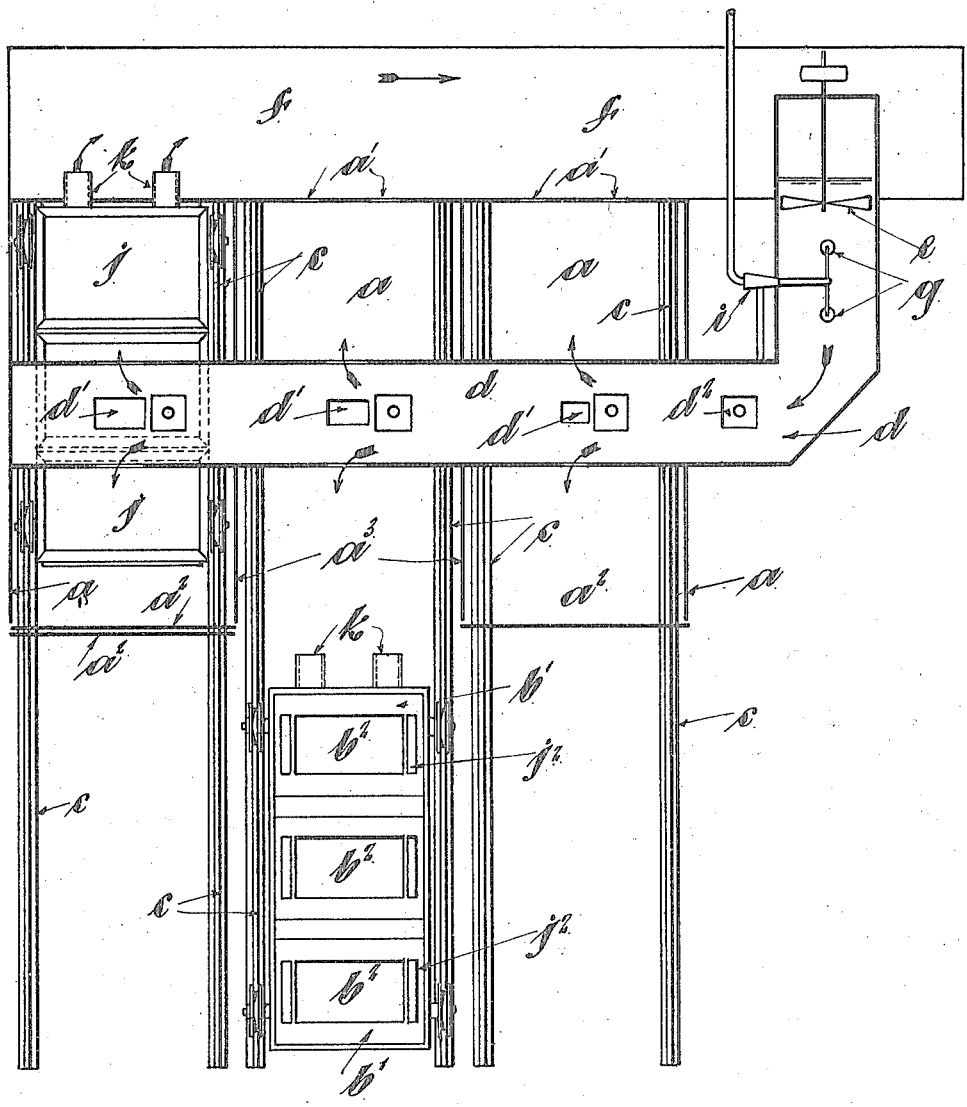

Fig. 2 a sectional plan of the improved apparatus.

Figure 3:
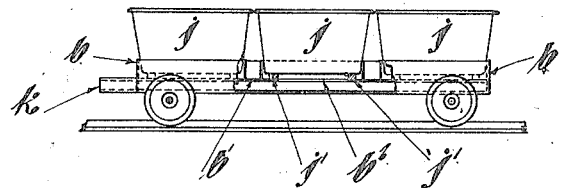

Fig. 3 illustrates a side elevation (partly in section) of one of the wagons used for holding the yarn or threads while being conditioned.

According to the invention, the improved apparatus comprises a large inclosed chamber $a$, constructed preferably of wood, and of an area in plan suitable for holding a series of wagons $b$, $b$, $b$. In height the chamber is such as to admit the wagons, which preferably run upon rails $c$, and also to admit in its upper part a large hollow trunk or conduit $d$, which is also preferably made of wood. This trunk at one end is closed but at its other end it extends through the wall of the chamber where it joins to one side of the casing of a powerful fan $e$, shown diagrammatically.

Behind the chamber $a$ is a further hollow trunk or conduit $f$, which on one side abuts closely against the rear wall of the chamber, see Fig. 2, and at one end communicates with the other side of the fan casing.

In that part of the trunk $d$ nearest the fan is an arrangement of atomizers $g$, supplied with water from a tank $h$. The water will preferably be delivered under pressure to the atomizers by means of an injector $i$ worked by steam or hot air. In the sides and floor of the trunk $d$ are openings $d'$, graduated in size from one end of the trunk to the other. In the rear wall of the chamber $a$ are holes $a'$ opening into the trunk or conduit $f$.

The wagons $b$ carry removable baskets $j$ which rest upon ledges $b'$ extending inward from the sides and cross members of the wagon, a large opening $b^2$ being left below each basket. Upon the underface of each basket are the usual battens $j'$ running lengthwise of the basket while upon the transverse parts of the ledges $b'$ are battens $j^2$, these latter serving to close the openings that would otherwise be left between the baskets and ledges at the ends of the baskets, and making it impossible for anything to pass downward through the opening $b^2$ without having first passed through the bottom of the basket.

To one end of each wagon are fitted short pipes $k$, these latter, when the wagon is fully in the chamber $a$, extending through the openings $a'$ in the rear wall of the chambers, see Fig. 2.

With the wagons charged with baskets, filled with yarn or threads for conditioning, and pushed into the chamber $a$, the doors $a^2$ of the chamber, which are preferably of the sliding type, are closed. The fan $e$ and injector $i$ are then started, whereupon air is circulated through the trunk $d$, through the holes $d'$, then downward through the baskets, then through the pipes $k$ into the conduit $f$, and then back to the fan, and so on continuously.

In passing the atomizers $g$ the air takes up the atomized water, and carries the bulk of it through the apparatus, including the baskets $j$ and the yarn therein, the moistened air having no other path than that provided by the interstices in the bottoms of the baskets, the openings $b^2$ and pipes $k$ to reach the trunk $f$.

The steam or hot air used for injecting the water serves also to heat the water, thereby helping to maintain the humidity of the air while being circulated through the apparatus. If desired, separate air-heating apparatus may be provided between the fan and atomizers, or at any other desired point.

An important feature of the aforesaid construction of apparatus is that the air circulates in a substantially horizontal path, thus eliminating as far as possible undue wetting of the yarn. In previously proposed apparatus the circulation of the moistened air is in a substantially vertical path.

To catch any water not taken up by the air, the trunk $d$ is provided with a small sinking $d^2$ and drain pipe $d^3$, the latter extending down into the tank $h$, see Fig. 1. Any water lodging in the other parts of the trunk $d$ may be drained back to the tank by a pipe $d^4$ shown in Fig. 1. The tank $h$ will be connected with the water main under control of a ball float, When the full number of baskets are not on a wagon, the orifice or orifices that would be left uncovered by the missing basket or baskets is or are covered by a loose board or boards provided for the purpose.

While showing three wagons $b$, there may be more or less, the length of the chamber $a$ being modified to suit. The chamber will preferably be divided by partitions $a^3$.

What I claim is:—

1. Apparatus for damping or conditioning yarn or thread comprising, a series of chambers arranged side by side, common inlet and return conduits passing from end to end of said chambers and common to the lot, said conduits communicating at one end, a sprayer and fan located at the junction of said inlet and return conduits, the chamber inlets gradually increasing in size from the fan, in combination with baskets adapted to be carried on rail wagons and formed with pipes positioned to enter openings in the return conduit, provision being made to drain off excess moisture, substantially as described.

2. Apparatus for damping or conditioning yarn or threads, comprising, in combination, a chamber, a perforated horizontal conduit within and extending from end to end of the chamber and also beyond one end of the chamber, a further horizontal conduit outside the chamber, apertures in the rear wall of the chamber, means for delivering water in a finely divided and heated state into the said inner conduit, a fan for continuously circulating air through the apparatus, wagons designed to be wheeled into and out of the said chamber and adapted to receive and carry baskets, each wagon being hollow and at a point below each basket having a large orifice, pipes at one end of the wagon, and baskets and battens therefor and bars of wood on the wagon, as set forth.

In witness whereof I have hereunto set my hand in the presence of two witnesses.

THOMAS HALLIWELL.

Witnesses:
F. C. PENNINGTON,
F. J. MEREDITH.